United States Patent [19]
Dowell

[11] Patent Number: 5,455,471
[45] Date of Patent: Oct. 3, 1995

[54] ELECTRIC MOTOR WITH SHAFT BEARING HAVING ALIGNMENT FEATURE

[75] Inventor: James R. Dowell, Owosso, Mich.

[73] Assignee: Magnetek Universal Electric, Owosso, Mich.

[21] Appl. No.: 293,085

[22] Filed: Aug. 19, 1994

Related U.S. Application Data

[63] Continuation of Ser. No. 890,725, Jun. 1, 1992, abandoned.
[51] Int. Cl.⁶ .............................. H02K 5/16; H02K 7/08
[52] U.S. Cl. .............................. 310/90; 384/192; 384/495
[58] Field of Search ................................ 310/87, 89, 90, 310/91; 384/192, 193, 204, 207, 208, 213, 495, 912, 913

[56] References Cited

U.S. PATENT DOCUMENTS

| 3,367,728 | 2/1968 | Labbie . | |
|---|---|---|---|
| 3,661,433 | 5/1972 | Schuster | 384/204 |
| 4,362,342 | 12/1982 | Bushor et al. | 310/90 X |
| 4,368,931 | 1/1983 | Casler et al. | 384/192 |
| 4,633,112 | 12/1986 | Miyake | 310/90 |
| 4,678,350 | 7/1987 | Statz | 384/207 X |
| 4,800,309 | 1/1989 | Lakin | 310/90 |
| 4,806,025 | 2/1989 | Kamiyama et al. | 310/90 X |
| 4,887,916 | 12/1989 | Adam et al. | 310/90 X |

FOREIGN PATENT DOCUMENTS 9003131  4/1990  European Pat. Off. ............... 384/208

Primary Examiner—Steven L. Stephan
Assistant Examiner—E. To
Attorney, Agent, or Firm—Barnes, Kisselle, Raisch, Choate, Whittemore & Hulbert

[57] ABSTRACT

An electric motor that includes a case having an axially oriented stamped steel endhead, a motor output shaft projecting from the endhead for coupling to a motor load, and a self-aligning spherical bearing mounted on the endhead for rotatably supporting the shaft. The bearing has a cylindrical extension that projects axially outwardly from the motor case coaxially with the shaft. The bearing extension is constructed and arranged to be engaged by the support structure and/or load coupled to the shaft for locating the same coaxially with the shaft. The bearing, including the extension, is of homogeneously integral unitary construction, preferably of lubricant-impregnated porous metal.

6 Claims, 2 Drawing Sheets

ELECTRIC MOTOR WITH SHAFT BEARING HAVING ALIGNMENT FEATURE

This is a continuation of copending application Ser. No. 07/890,725, filed on Jun. 1, 1992, now abandoned.

The present invention is directed to electric motors with shaft bearings, and more particularly to an improved bearing construction in such an electric motor for facilitating alignment of the motor shaft with the surrounding support structure and/or load.

BACKGROUND AND SUMMARY OF THE INVENTION

In many applications it is desirable or even critical that the output shaft of an electric motor be accurately aligned coaxially with the support structure and/or load engaged by the motor. In such applications it has been the practice to machine or otherwise form a rabbit on the endhead casting of the electric motor case coaxially with the shaft that protrudes through the endhead. For enhanced accuracy where such alignment is critical, it has been conventional practice first to assemble the motor, and then to machine the rabbit while locating off of the motor output shaft. Such operations, requiring complex and accurate machining fixtures, are time consuming and expensive.

A general object of the present invention is to provide an electric motor construction having facility for accurate location of a support structure or load coaxially with the motor output shaft that is easy and inexpensive to manufacture. A more specific object of the invention is to provide a motor construction of the described character that eliminates the necessity in the prior art for machining the endhead casting, and in which the endhead member may therefore be of less expensive stamped steel construction.

An electric motor in accordance with a presently preferred embodiment of the invention includes a case having an axially oriented end member or head, a motor output shaft projecting from the end member for coupling to a motor load, and a bearing mounted on the end member for rotatably supporting the shaft. The bearing has a shoulder or extension that extends axially outwardly from the motor case coaxially with the shaft. The bearing extension is constructed and arranged to be engaged by the support structure and/or load coupled to the shaft for locating the same coaxially with the shaft. The bearing, including the extension, is preferably of homogeneously integral unitary construction, such as of lubricant-impregnated porous metal. The bearing is of sleeve-type or, more preferably, self-aligning spherical construction. The end member may be of cast or, more preferably, stamped steel construction. The bearing extension has a radially outwardly facing surface engagable by the load and/or motor support structure. This surface preferably is cylindrical, but could also be square or other shape in suitable applications.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
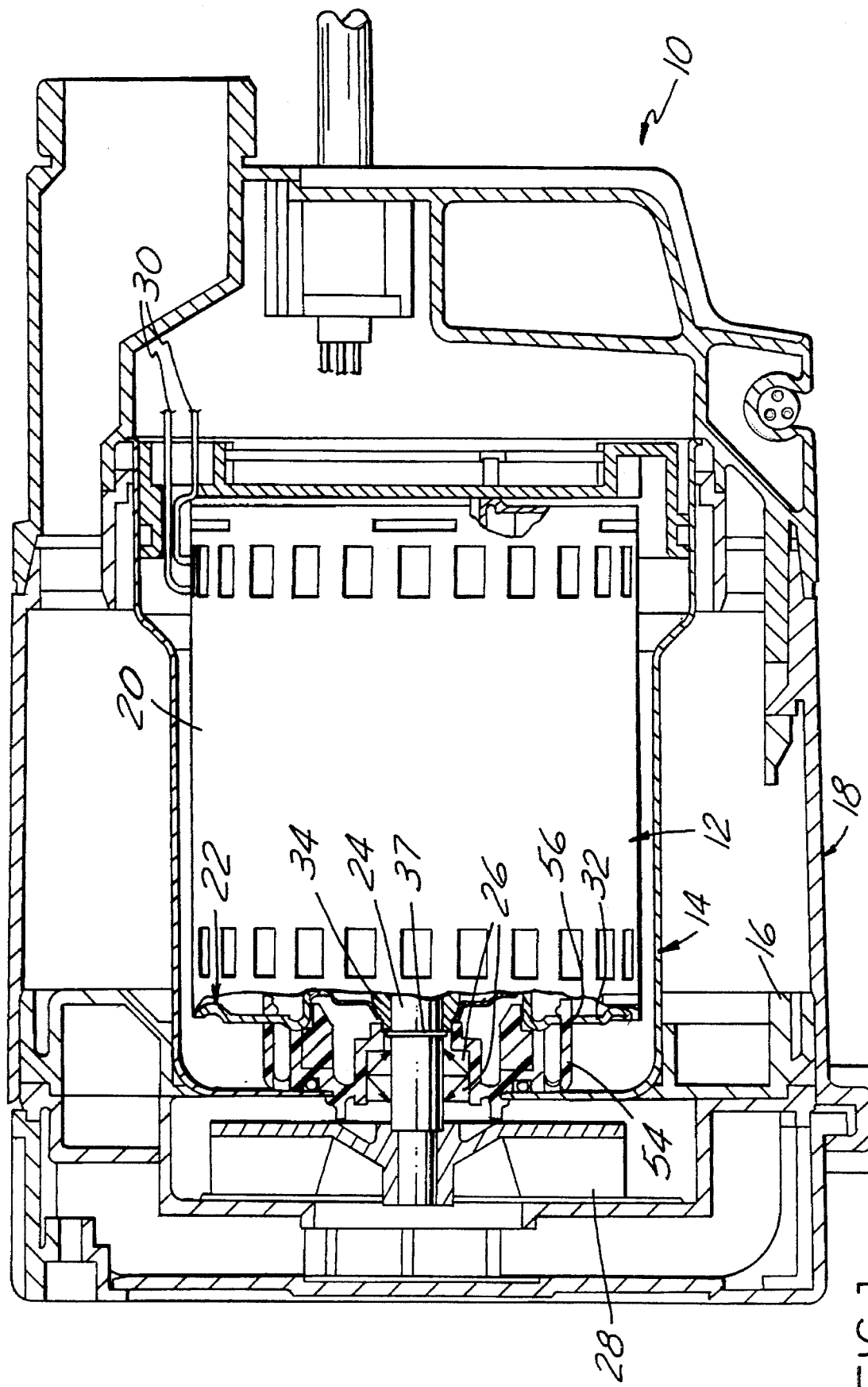
FIG. 1 is a sectional view in side elevation of a submersible pump that embodies an electric motor in accordance with a presently preferred implementation of the invention.

FIG. 1 illustrates a submersible pump 10 that includes an electric motor 12 in accordance with the present invention mounted within a seal housing 14. Seal housing 14 is mounted on a septum 16 within a pump housing 18. Electric motor 12 has a substantially cylindrical case 20 with an axially oriented end head 22 at one end thereof. A motor output shaft 24 extends axially through endhead 22, through a pair of lip seals 26 carried by seal housing 14, and is coupled to a pump impeller 28. Within motor 12 there are disposed the usual electric motor stator windings that receive electric power through the conductors 30, and a rotor coupled to shaft 24. The internal stator/rotor construction of motor 18 may be any suitable Character, and does not form part of the present invention.

Figures 2, 3:
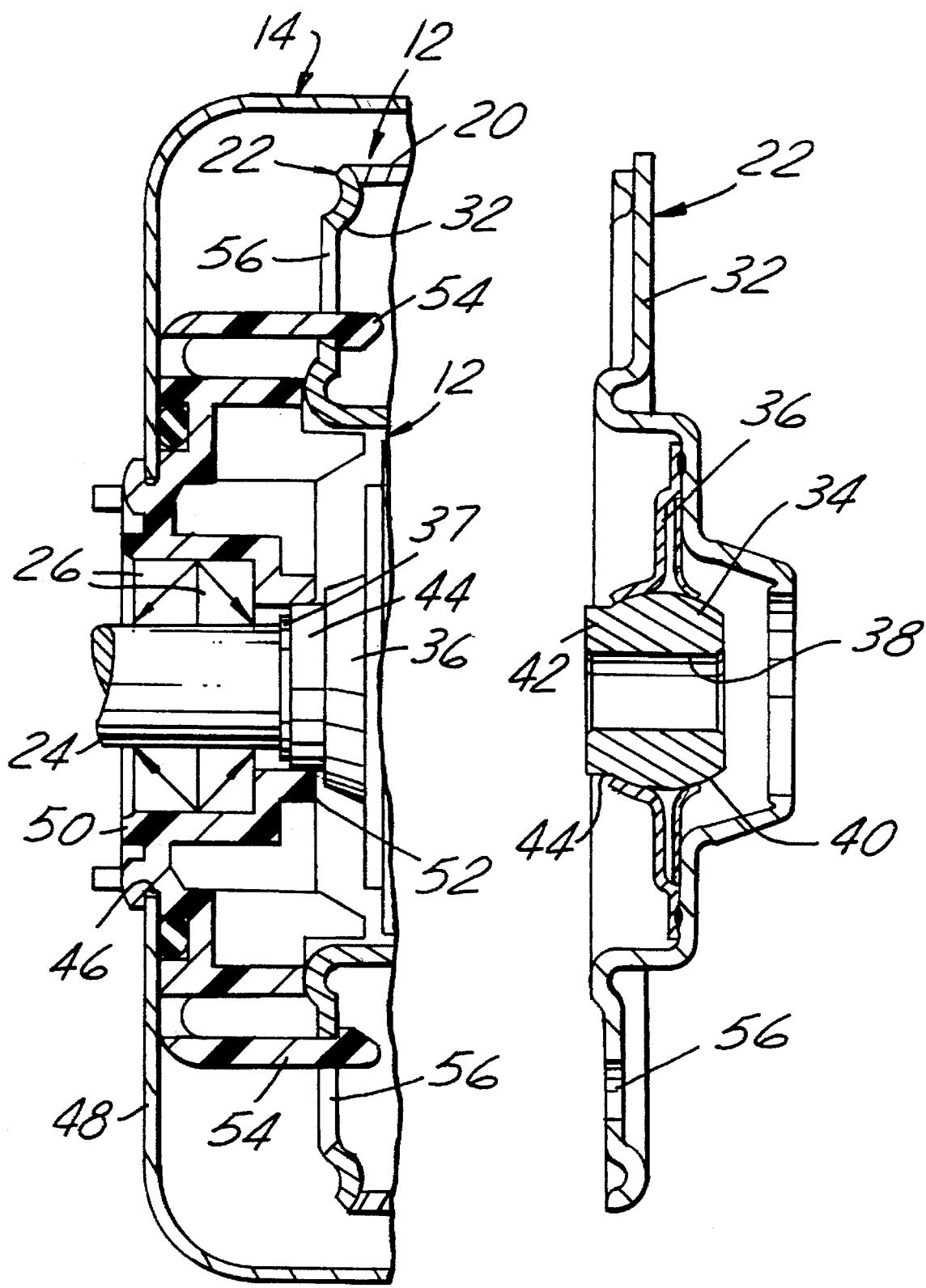
FIG. 2 is a fragmentary view on an enlarged scale of a portion of the motor/pump construction illustrated in FIG. 1.
FIG. 3 is a sectional view in side elevation of the endhead subassembly in the motor of FIGS. 1 and 2.

Referring to FIGS. 1–3, endhead 22 comprises a subassembly that includes a stamped steel end plate 32 suitably fastened at its periphery to motor case 20. A spherical bearing 34 is mounted to plate 32 by a bearing retainer 36 that is welded or otherwise suitably secured to the end plate. A snap ring 37 encircles shaft 24 externally of bearing 34. Bearing 34 preferably comprises an oil-impregnated porous metal bearing of sintered brass or other suitable metallic construction. Bearing 34 has an internal cylindrical bore 38 for rotatably supporting motor shaft 24, and an external spherical surface 40 for self-aligning engagement with bearing retainer 36. To the extent thus far described, pump 10, motor 12 and endhead 22 are of generally conventional construction.

In accordance with the present invention, a shoulder or extension 42 projects axially outwardly from the body of bearing 34 externally of endhead 22 and motor 12. Extension 42 is of homogeneously integral unitary construction with the remainder of bearing 34, and has a radially outwardly oriented surface 44 coaxial with bearing bore 38, and therefore coaxial in assembly with motor output shaft 24. Extension surface 44 preferably is cylindrical, but could be square or other suitable geometry in appropriate applications.

Seal housing 14 has a substantially cylindrical case with an opening 46 in the case end wall 48. A molded plastic seat 50 is secured to end wall 48 within opening 46. Lip seals 26 are mounted within seat 50 surrounding shaft 24. Seat 50 has a neck 52 that engages and locates on surface 44 of bearing extension 42 so that motor 12 and motor shaft 24 are accurately located coaxially with seat 50 and lip seals 26. Thus, neck 52 molded integrally with seat 50, and extension 42 formed integrally with bearing 34 cooperate with each other accurately to locate the axis of motor shaft 24 without requiring either a heavy and expensive endhead casting or extra machining operations thereon. A circumferential array of locking clips 54 extend from seat 50 and are received in corresponding apertures 56 on endhead 22 for fastening motor 12 in position.

I claim:

1. An electric motor having a case with an axially oriented end member forming an external wall of said case, a motor output shaft projecting from said end member for coupling to a load and a bearing mounted on said end member having an internal cylindrical bore for rotatably supporting said shaft, said bearing having an integral extension oriented and extending axially outwardly of said end member coaxially with said shaft and externally of said end member, said extension having an outwardly oriented surface coaxial with said cylindrical bore, said extension being constructed and arranged for engagement by structure external to said case and end member operatively coupled to said shaft and engaging said outwardly oriented surface of said extension for locating the structure coaxially with said shaft.

2. The motor set forth in claim 1 wherein said end member is of stamped steel construction.

3. The motor set forth in claim 2 wherein said bearing is of lubricant-impregnated porous metallic construction.

4. The motor set forth in claim 3 wherein bearing comprises a self-aligning spherical bearing.

5. An electric motor assembly that includes:

an electric motor having a case with an end member, a shaft protruding from said end member for coupling to a load and a bearing mounted on said end member having an internal cylindrical bore rotatably supporting said shaft, a housing enclosing said motor having an opening through which said shaft extends and a seal engaging said shaft at said opening, means of homogeneously integral unitary construction with said bearing defining an extension coaxial with said shaft and extending outwardly from and externally of said end member, said extension having an outwardly oriented surface coaxial with said cylindrical bore, and seating means on said housing surrounding said opening and having a surface engaging said surface on said extension externally of said end member such that said opening and seal are accurately located coaxial with said shaft by locating engagement of said seating means with said extension.

6. The electric motor assembly set forth in claim 5 wherein said surface on said extension and said surface on said seating means are cylindrical.

* * * * *